Figures 1, 5:
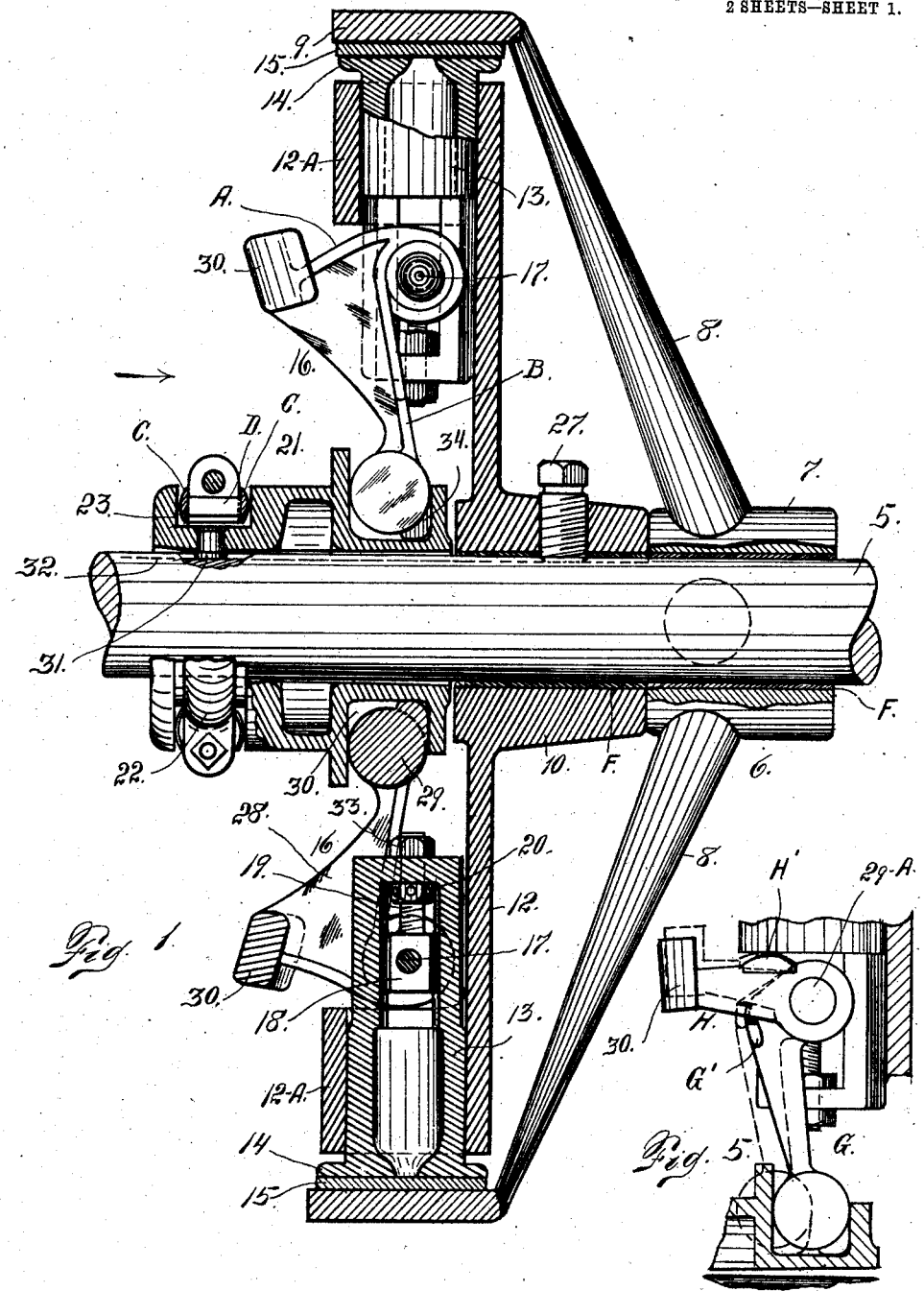

No. 883,658. PATENTED MAR. 31, 1908.
H. LUTZ.
FRICTION CLUTCH.
APPLICATION FILED JAN. 23, 1907.

2 SHEETS—SHEET 1.

Witnesses
Otto E. Hoddick
Dena Nelson

Inventor
Henry Lutz
By _____
Attorney

No. 883,658.  
PATENTED MAR. 31, 1908.  
H. LUTZ.  
FRICTION CLUTCH.  
APPLICATION FILED JAN. 23, 1907.  
2 SHEETS—SHEET 2.
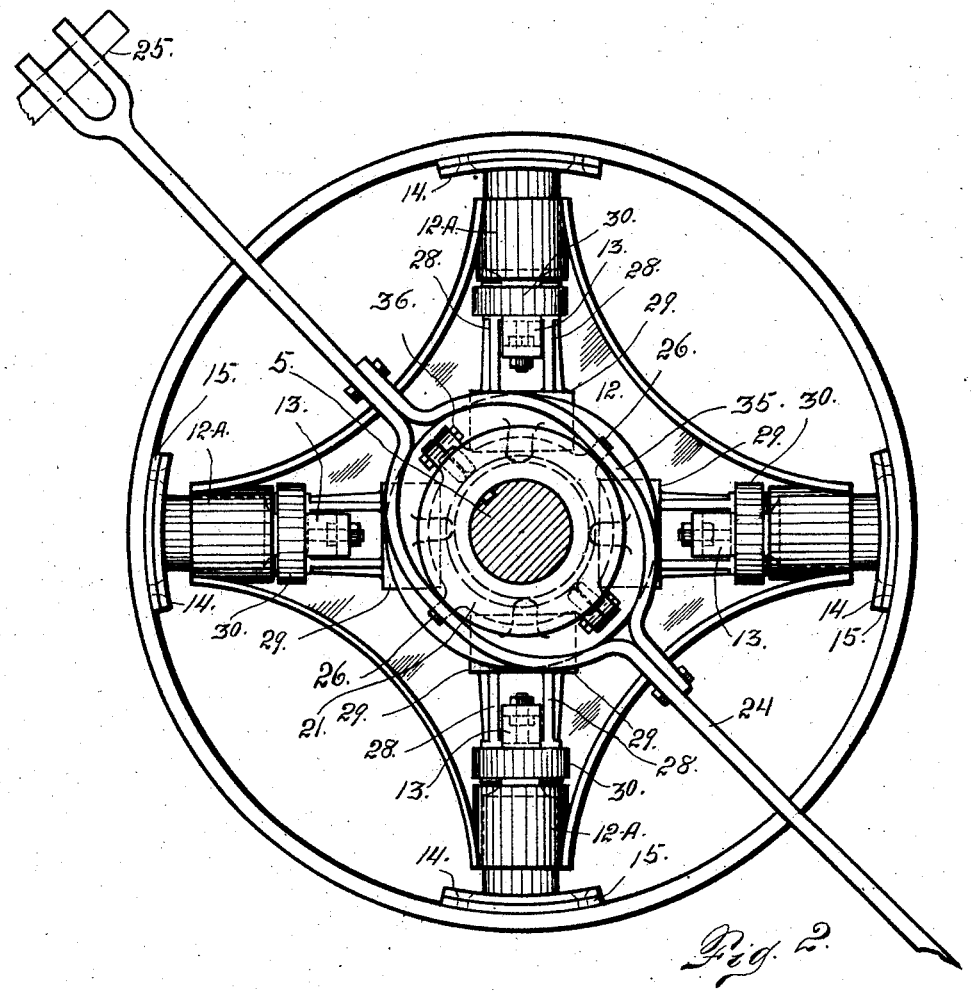
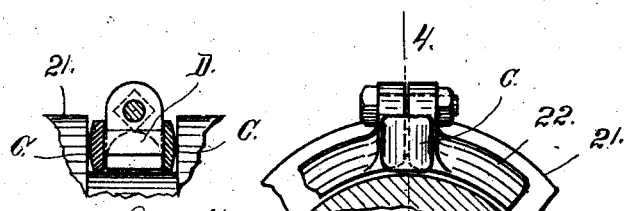
Witnesses  
Otto E. Haddick  
Dena Nelson
Inventor  
Henry Lutz  
By A. J. W???  
Attorney

UNITED STATES PATENT OFFICE.

HENRY LUTZ, OF DENVER, COLORADO.

FRICTION-CLUTCH.

No. 883,658.  Specification of Letters Patent.  Patented March 31, 1908.

Application filed January 23, 1907. Serial No. 353,643.

*To all whom it may concern:*

Be it known that I, HENRY LUTZ, a citizen of the United States, residing at the city and county of Denver and State of Colorado, have invented certain new and useful Improvements in Friction-Clutches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in friction clutches, my object being to provide a clutch adapted to remain in any desired position of adjustment regardless of the tendency of centrifugal force to throw the friction shoes or devices into operative engagement with the wheel to be actuated.

My further object is to provide a construction which to a certain extent is automatically adjustable, all of which will be fully understood by reference to the accompanying drawing in which is illustrated an embodiment thereof.

In this drawing, Figure 1 is a section taken through my improved clutch mechanism shown in connection with the wheel to be operated. Fig. 2 is a view looking in the direction of the arrow in Fig. 1. Fig. 3 is a fragmentary detail view of the ring connected with the sleeve for adjusting the clutch mechanism. Fig. 4 is a section taken on the line 4—4 Fig. 3. Fig. 5 is a modified form of the "balance levers."

The same reference characters indicate the same parts in all the views.

Let the numeral 5 designate a driving shaft, and 6 a wheel loose thereon and adapted to be rotated through the instrumentality of the clutch mechanism. As shown in the drawing this wheel is composed of a hub 7, spokes 8 and a friction rim 9. The clutch mechanism comprises a hub 10, a web 12 formed integral with the hub, casings 12ᴬ formed integral with the outer portions of the web, plungers 13 slidable in the casings, shoes 14 formed integral with the plungers and provided with wearing plates 15, levers 16 pivoted at 17 in blocks 18 adjustable in the plungers by means of threaded stems 19 and nuts 20; a sleeve 21 slidable on the shaft; a ring 22 surrounding the sleeve and engaging a groove 23 therein and a lever 24 fulcrumed at 25 and engaging lugs 26 with which the ring 22 is provided.

The hub 10 is secured to the shaft by a set bolt 27. The balance levers 16 have the general shape of bell crank levers, each lever having a bifurcated web 28, a cylindrical part 29 at the extremity of one arm, and a curved part 30 at the extremity of the other arm. The cylindrical part 29 engages a circumferential groove 30 formed in the sleeve 21; while the arm provided with a weight 30 extends outwardly from the fulcrum 17 in a direction parallel with the axis of the shaft.

The sleeve 21 is formed somewhat larger than the shaft, the opening therein increasing in size in both directions from a pin 31 which passes through the sleeve and engages the bottom of a shallow groove 33 formed in the shaft 5. By virtue of this construction the sleeve is permitted a slight rocking or lateral movement on the shaft, to compensate for inaccuracies in the adjustment of the balance levers. The radial distance of the fulcrums of these levers from the shaft 5, is determined by the longitudinal adjustment of the blocks 18 in the plungers 13, this adjustment being accomplished as heretofore explained by turning the nut 20 which is threaded on the stem 19 of the block, the nut being provided with recesses to permit the use of a pin or hand spike. The nut 20 is located on one side of the inner extremity of a hollow piston 13 while a lock nut 33 is located on the opposite side. Each cylindrical extremity 29 of each balance lever, is provided with a lug 34, which engages the wall of the groove 30.

The sleeve 21 is moved back and forth upon the shaft by means of a lever 24, the said lever being provided with a central ring 35 which engages lugs 26 formed on the ring 22, intermediate bolts 36 which connect the two parts of the ring 22. As the sleeve 21 is forced toward the right referring to Fig. 1, the axes of the cylindrical extremities 29 of the balance levers are made to approach the plane of the axes of the plungers, whereby the latter are forced outwardly radially causing the wearing plates 15 to engage the inner surface of the rim of the wheel 9, thus practically locking the plungers and the said wheel together and causing the latter to rotate with the shaft. As this sleeve is thrust toward the right for the purpose of applying the friction faces of the plungers to the rim of the wheel in order to rotate the latter, if it happens that the adjustment of the fulcrum 17 of any of the balance levers is inaccurate, that is to say that one or more of the levers has its fulcrum point at a greater or less distance from the axis of the shaft than the fulcrum points of the other levers, the rocking movement allowed the sleeve as heretofore explained, will compensate for this inaccuracy, and cause all of the friction shoes of the plungers to engage the rim of the wheel with equal force, thus making the adjustment of the friction faces entirely automatic.

When it is desired to release the wheel from the engagement of the friction plungers, the sleeve is moved toward the left in Fig. 1 or in the direction opposite the arrow in said figure. When this is done the friction faces of the plungers are released from operative engagement with the rim of the wheel, and the tendency of the said plungers to move outwardly automatically, by virtue of centrifugal force, during the rotation of the shaft, is neutralized or overcome by the weights 30 connected with one arm of each balance lever as heretofore explained. The two arms of each balance lever may be designated A and B respectively. The tendency of the plungers and their balance levers to move outwardly under the influence of centrifugal force, is prevented by the arms A coming into engagement with the inner extremities of the casings 12, and when the sleeve is shifted to disengage or release the friction faces of the plungers from the rim 9 of the wheel, this will occur before the friction faces are brought into engagement with the rim of the wheel, and the centrifugal force acting on the weights 30 will balance the effect of the same force acting on the plungers, and thus prevent the plungers from moving outwardly, and returning the balance levers to the operative position shown in Fig. 1, the last named position being that when the friction shoes are in operative engagement with the rim of the wheel. In order to lock the friction mechanism in operative engagement with the wheel, the sleeve 21 is thrust far enough to the right (see Fig. 1), to cause the bearing 29, to occupy a cross sectional plane passed through the shaft, slightly to the right (see Fig. 1), of the axes of the fulcrums of the said levers, or the axes of the plungers. It will be understood that the axes of the fulcrums 17 of the balance levers intersect the axes of the plungers at right angles.

The ring 22 is provided at each of the points where its members are connected by a small plate D which passes between the abutting extremities of the rings adjacent the lugs E through which the bolts 36 pass. These wearing plates engage the opposite walls of the groove 23, and they are curved to reduce the friction incident to the rotation of the sleeve 21 with the shaft while the ring 22 and the lever connected therewith are stationary, the said last named parts being non-rotatable. By virtue of this construction the wearing plates C are subjected to the entire wear upon the ring, and these may be renewed and replaced whenever necessary, at very inconsiderable expense. The hub 10 of the friction mechanism, and the hub 7 of the wheel are each provided with a bushing F which is in direct engagement with the shaft. This bushing may be replaced whenever desired.

From the foregoing description the use and operation of my improved clutch mechanism will be readily understood. Assuming that the driving shaft 5 together with the clutch mechanism, is rotating, if it is desired to transmit motion to the wheel 6, the sleeve 21 will be shifted to the position shown in Fig. 1, whereby the plungers are forced outwardly bringing their wearing plates into engagement with the inner face of the rim 9 of the wheel. This movement of the plungers is accomplished through the medium of the balance levers which engage the sleeve as heretofore explained. By giving the sleeve a sufficient thrust toward the right, the plungers will be locked in operative engagement with the wheel, against accidental displacement. Again whenever it is desired to release the wheel, the sleeve 21 is shifted in the opposite direction or toward the left of Fig. 1, this movement will throw the balance levers to such position that the plungers are allowed to recede from the rim of the wheel, and the centrifugal force acting on the weighted arms of the balance levers will maintain the plungers in the disengaged position, since the said weighted arms will serve to balance the tendency of the centrifugal force to move the plungers outwardly into operative relation with the wheel.

In the form of construction shown in Fig. 5, each balance lever is composed of two members pivotally connected by the fulcrum pin 29$^A$ which connects the lever with the block 18 of the plunger. One member of this lever is designated G and the other member H. The member G engages the sleeve and is similar to the arm B of the lever 16; while the member H of this form of construction is similar to the arm A of the balance 16. However, during the movement of the sleeve in this form of construction, the member G is allowed a limited movement toward the left (see Fig. 5) but the arm H is actuated. The member G is provided with a lug G' which when this member has been moved a limited distance, will engage the member H, after which the two members of the lever will move in substantially the same manner as if they were integral, that is as long as the movement toward the left is continued. The member H is provided with a part H', adapted to engage the inner extremity of the casing 12, whereby the plunger connected with the lever is prevented from outward movement under the action of centrifugal force, and the weight 30 of the member H will move outwardly, and cause the plunger to move inwardly, since the point of engagement of the lug H' is farther from the weight 30 than from the axes of the plunger. In other words the weight 30 in either form of construction is connected with the long arm of the lever, whose fulcrum is the point of engagement of the member H or the arm A as the case may be, with the inner extremity of the casing 12, and after this condition is brought about, if the centrifugal force is sufficient to impart any movement to the clutch members, the weights 30 will be thrown outwardly and the plungers 13 inwardly.

By virtue of the cylindrical shape of the part 29 of the balance lever, the friction plungers are prevented from rotating in the casings. Each of the balance levers 16 is provided with a bifurcated web adapted to straddle the plungers. This feature is best illustrated in Fig. 2, where each web member is designated by the numeral 28.

Having thus described my invention, what I claim is:

1. The combination of a driving shaft, a clutch wheel mounted to rotate therewith and provided with open ended casings, plungers slidable in said casings and provided at their outer extremities with friction faces, a sleeve slidable on the shaft, and balance levers pivoted on the plungers, the said levers having approximately the shape of bell cranks, one arm of each bell crank engaging the sleeve, while the other arm is provided with a weight, substantially as described.

2. The combination with a shaft, of a hub mounted to rotate therewith, the said hub being provided with a web having a plurality of open ended casings at its outer edge, friction plungers slidable in said casings, a sleeve slidable on the shaft, and balance levers pivoted on the plungers and connected with the sleeve, each lever having a weighted arm, substantially as described.

3. The combination with a shaft, of a hub mounted thereon to rotate therewith, open ended casings integral with the hub and formed of one piece and located at a suitable distance therefrom, friction plungers slidable in the casings, a sleeve slidable on the shaft, the opening in the sleeve being coned to permit a rocking or lateral movement of said sleeve, and a suitable connection between the plungers and the shaft, whereby the tendency of the plungers to move outwardly by the action of centrifugal force is neutralized or overcome, substantially as described.

4. The combination with a shaft, of a friction wheel mounted thereon, friction devices movable radially on the wheel, a sleeve slidable on the shaft having its inner surface coned in opposite direction from a given cross sectional plane whereby a rocking or lateral movement is obtained, and means for connecting friction devices with the sleeve to neutralize or balance the tendency of the centrifugal force to move the friction devices outwardly automatically, substantially as described.

5. The combination with a shaft, of a hub mounted to turn therewith, a sleeve also mounted to turn therewith and slidable thereon, the opening of the said sleeve being formed somewhat larger than the shaft, in both directions from a given cross sectional plane, friction devices slidable in the hub and balance levers connecting the friction devices with the shaft, the said levers being pivoted on the friction devices, and means for adjusting the radial position of the fulcrums, substantially as described.

In testimony whereof I affix my signature in presence of two witnesses.

HENRY LUTZ.

Witnesses:
 DENA NELSON,
 A. J. O'BRIEN.